United States Patent
Kurihara et al.

[11] Patent Number: 6,031,712
[45] Date of Patent: Feb. 29, 2000

[54] ELECTRIC DOUBLE LAYER CAPACITOR

[75] Inventors: Junko Kurihara; Koji Sakata; Gaku Harada, all of Tokyo, Japan

[73] Assignee: NEC Corporation, Tokyo, Japan

[21] Appl. No.: 09/050,638

[22] Filed: Mar. 27, 1998

[30] Foreign Application Priority Data

Mar. 28, 1997 [JP] Japan .................................... 9-094611

[51] Int. Cl.[7] .................................................. H01G 9/00
[52] U.S. Cl. ........................ 361/502; 361/503; 361/504; 361/508; 29/25.03
[58] Field of Search ................................. 361/502, 505, 361/500, 501, 503, 504, 508, 509, 511, 516, 517; 29/25.03; 252/502, 510, 511

[56] References Cited

U.S. PATENT DOCUMENTS

| | | | |
|---|---|---|---|
| 3,652,902 | 3/1972 | Hart et al. ............................... | 361/502 |
| 4,327,400 | 4/1982 | Muranaka et al. ....................... | 361/433 |
| 4,574,255 | 3/1986 | Fujii et al. ................................ | 331/25 |
| 5,103,379 | 4/1992 | Kurabayashi et al. ................... | 361/502 |
| 5,150,283 | 9/1992 | Yoshida et al. .......................... | 361/502 |
| 5,277,729 | 1/1994 | Endo et al. ............................... | 429/192 |
| 5,450,279 | 9/1995 | Yoshida et al. .......................... | 361/502 |
| 5,464,724 | 11/1995 | Akiyama et al. ......................... | 430/272 |
| 5,538,811 | 7/1996 | Kanbara et al. .......................... | 429/192 |
| 5,557,497 | 9/1996 | Ivanov et al. ............................. | 361/502 |
| 5,776,637 | 7/1998 | Kashio et al. ............................ | 429/217 |

FOREIGN PATENT DOCUMENTS

| | | | |
|---|---|---|---|
| 55-93216 | 7/1980 | Japan | H01G 9/00 |
| 593915 | 1/1984 | Japan | H01G 9/00 |
| 62200715 | 9/1987 | Japan | H01G 9/00 |
| 3184206 | 8/1991 | Japan | H01B 3/00 |
| 465814 | 3/1992 | Japan | H01G 9/00 |
| 4186312 | 7/1992 | Japan | H01G 4/12 |
| 597504 | 4/1993 | Japan | C04B 35/00 |
| 5-319906 | 12/1993 | Japan | C04B 35/00 |
| 8111346 | 4/1996 | Japan | H01G 4/12 |
| 8-253305 | 10/1996 | Japan | C01B 31/08 |

*Primary Examiner*—Kristine Kincaid
*Assistant Examiner*—Eric Thomas
*Attorney, Agent, or Firm*—Hayes Soloway Hennessey Grossman & Hage PC

[57] ABSTRACT

An aqueous electric double layer capacitor having excellent wettability with aqueous electrolytic solution, low internal resistance, excellent easiness of forming uniform, thin and wide films and mechanical strength. Activated carbon powder, a polymeric binder having a hydrophilic group and a plasticizer are fully mixed to form a film which is then dried to form an electrode. By using a polymer having a hydrophilic group as a binder, wettability between an aqueous electrolytic solution and the electrode is improved and contact resistance between an electrolysis solution and the electrode can be reduced. In addition, by adding a plasticizer, the amount of polymer binder required to form a thin type electrode can be reduced, thus providing an aqueous solution electric double layer capacitor with low internal resistance.

6 Claims, 1 Drawing Sheet

ELECTRIC DOUBLE LAYER CAPACITOR

FIELD OF THE INVENTION

The present invention relates to an electric double layer capacitor and more particularly to an aqueous solution type electric double layer capacitor.

RELATED ART

A conventional electric double layer capacitor is so configured that two electrodes formed of activated carbon are disposed, via an ion permeable membrane film, opposite to each other, on current collecting bodies including an electrically conductive rubber or metallic foil wherein, e.g. diluted sulfuric acid including an electric double layer forming ion such as a sulfuric acid ion is used as an electrolytic solution. There are two types of the electric double layer capacitors; one type of the capacitor uses an electrolytic solution of aqueous solution type such as an aqueous solution of sulfuric acid while the other type of the capacitor uses an electrolytic solution of the organic solution type wherein an electrolyte is added to organic solvent such as propylene carbonate, γ-butyrolactone, acetonitrile, dimethylformamide. The selection of the electrolytic solution for an electric double layer capacitor is of great importance because the performance is dependent on an electrolytic solution to be used. The characteristics of electric double layer capacitors using an aqueous type electrolytic solution and organic solvent type electrolytic solution, respectively, are hereinafter described.

The advantage of the electric double layer capacitor using an aqueous electrolytic solution resides in that the internal resistance of the electric double layer capacitor itself can be made low because of low electric resistance of the electrolytic solution. It is, therefore, suitable to the application wherein high current load discharging is required. In addition, the absorption of moisture in air does not exert influence on the properties of the capacitor, thus allowing simple armor shielding. On the other hand, there is a disadvantage of the electric double layer capacitor using an aqueous electrolytic solution that, because electrolysis of water occurs at 1.23V, allowable voltage (limit) per single cell must be less than the voltage that water electrolysis occurs. For this reason, the allowable voltage of an actual product is set to about 1 volt.

The advantage of the electric double layer capacitor using organic electrolytic solution is that, because of higher allowable voltage of the organic solvent, the allowable voltage per single cell is comparatively high at about 3V. On the other hand, there is a disadvantage that, due to high electric resistance of the electrolytic solution, the internal resistance of the electric double layer capacitor is comparatively high. The absorption of moisture in air causes low allowable voltage or generation of gas caused by water electrolysis, and therefore high hermetic armor is required to avoid invasion of water during the use.

Activated carbon is usually used as a material for an electrode of an electric double layer capacitor in powder or fiber form.

In case of an electrode using activated carbon powder, it has been used in paste form wherein activated carbon powder is mixed with an electrolytic solution such as an aqueous solution of sulfuric acid. In the case of an electrode using activated carbon powder, the amount of the electrolytic solution must be optimized and pressure must be applied to the electrode in order to maintain contact between activated carbon powder particles.

Furthermore, a capacitor using an aqueous electrolytic solution, especially when it is used in the power application, uses activated carbon powder/carbon composite materials having macropores and micropores which can be obtained by mixing activated carbon powder, polymethyl methacrylate and phenolic resin powder, having them hardened by heat and carbonizing at a high temperature. However, in this method, while the mixture is hardened by heat and carbonized, heat cannot be supplied uniformly, causing the electrode to be curved in the formation process of a thin electrode. As a result, in the case of an electrode using such composite materials of activated carbon powder and carbon, it is difficult to produce an electrode having a thickness of less than several hundreds microns and a wider area.

Additionally, in case of an electrode using activated carbon fibers, because it usually employs an activated carbon textile woven of active carbon fibers, its thickness is large, disabling the formation of an electrode with wide areas. It has been therefore proposed to provide a thin film electrode by a mixture of activated carbon powder and binders.

DISCUSSION ON THE RELATED ART

A conventional electric double layer capacitor produced using a polarizable electrode, conductive adhesive and binder is described and discussed below.

As an example of an electric double layer capacitor using an organic solvent such as propylene carbonate, γ-butyrolactone, acetonitrile, dimethylformamide, methods of forming films from activated carbon and aqueous binders and from activated carbon, aqueous binders and a conductivity provider have been disclosed in JP Patent Kokai JP-A-4-65814.

However, such conventional methods of forming thin film electrodes have the following problems. That is, a polymer to be used as a binder is, in general, electrically insulating and, if such a binder is added to an electrode, internal resistance of the electrode becomes large, resulting in an increase in internal resistance of an electric double layer capacitor. It is clear that the reduction in the amount of the binder to be added to activated carbon is desirable, however, a method to reduce the amount of the binder has not yet so far disclosed. Moreover, it is natural that the contact resistance is dependent on properties of both an electrode and electrolytic solution. However, in the conventional art (as in Patent Kokai described above), the problem of contact resistance has been described only in relation to the organic solvent double layer capacitor, not at all in relation to an aqueous solution double layer capacitor.

Also, there have been examples of methods using a mixture of activated carbon or carbon black and PTFE powder as a polarizable electrode, and a mixture of graphite or carbon black and a binder as a conductive adhesive (in JP Patent Kokai JP-A-62-200715[1987]), or using fibrous carbon as a polarizable electrode and a mixture of graphite or carbon black etc. and a binder as a conductive layer (in JP Patent Kokai JP-A-59-3915[1984]). In these conventional methods, the binder has been used exclusively as a conductive adhesive which serves to adhere an electrode to a current collecting body.

Thus, in conventional methods relating to an electric double layer capacitor, particularly to an aqueous solution type electric double layer capacitor, there has been no proposal of a method of reducing contact resistance between an electrode and aqueous electrolytic solution as well as internal resistance of a capacitor by improving wettability of the electrode with the aqueous electrolytic solution in the case where activated carbon and polymeric binders are used. Also, the reduction of polymeric binders to be added to form a thin type electrode has not so far been proposed.

As an example of using a polymer having a hydrophilic group as a binder, there have been disclosures wherein a polymer with a hydrophilic group was used for the formation of an internal electrode sheet for a ceramic capacitor (JP Patent Kokai JP-A-8-111346[1996], JP-A-5-97504[1993], JP-A-4-186812[1992], JP-A-3-184206[1991]). However, in these processes, the binder is decomposed by heat and does not exist in the final product because drying and burning are executed following the formation of a green sheet. Thus, in conventional methods, polyvinyl butyral having a hydrophilic group has been temporarily used as a polymeric binder to maintain handling ability of the green sheet in the production of a ceramic capacitor.

SUMMARY OF THE DISCLOSURE

The following are a summary of problems of the conventional methods described above.

(1) The first problem is that conventional aqueous solution type electric double layer capacitors cannot provide an electrode having good wettability with an electrolytic solution and having low contact resistance between the electrolytic solution and the electrode. The reason for this is that a polymer to be used as a binder, which is required for the formation of a thin type electrode, has a good wettability with an organic solvent but poor wettability with an aqueous solution. This causes a higher increase in contact resistance in an aqueous electrolytic solution compared with that in organic electrolytic solution, resulting in an increase in internal resistance of an electric double layer capacitor.

(2) The second problem is that the resistance of the electrode itself in a thin type electrode with a polymeric binder added becomes high. Due to an increase in resistance of the electrode, internal resistance of the whole capacitor is increased as a result. Such increased internal resistance of the whole capacitor causes degradation of rapid charging property and high current discharging property accordingly. Therefore, the most possible reduction of the amount of polymeric binders to be used for the formation of a thin type electrode is necessary. The reason for that is that, because a polymeric binder is insulating, the addition of such polymeric binders causes the increase in resistance of the electrode itself and in internal resistance of the whole capacitor.

Accordingly, the present invention has been made to overcome problems in the conventional methods. It is an object of the present invention to provide a novel aqueous electric double layer capacitor having excellent wettability with an aqueous electrolytic solution and low internal resistance. It is another object of the present invention to provide an aqueous electric double layer capacitor also having an uniform thickness of a film, wider area of a film, excellent easiness of forming films and mechanical strength.

Further objects of the present invention will become apparent in the entire disclosure.

To achieve above objects, the electric double layer capacitor of the present invention is generally characterized by using an electrode comprising activated carbon powder, a polymeric binder having a hydrophilic group and a plasticizer.

According to an aspect of the present invention, it is characterized by using a polymeric binder selected from polyvinyl pyrrolidone, polyvinyl butyral, polyvinyl acetate etc. as a polymeric binder having a hydrophilic group;

Also, another aspect of the present invention is characterized by using as butylphthalylbutylglycolate as a plasticizer.

Furthermore, a further aspect of the present invention is characterized by using an aqueous solution type electrolytic solution such as sulfuric acid.

PREFERRED EMBODIMENTS

Figure 1:
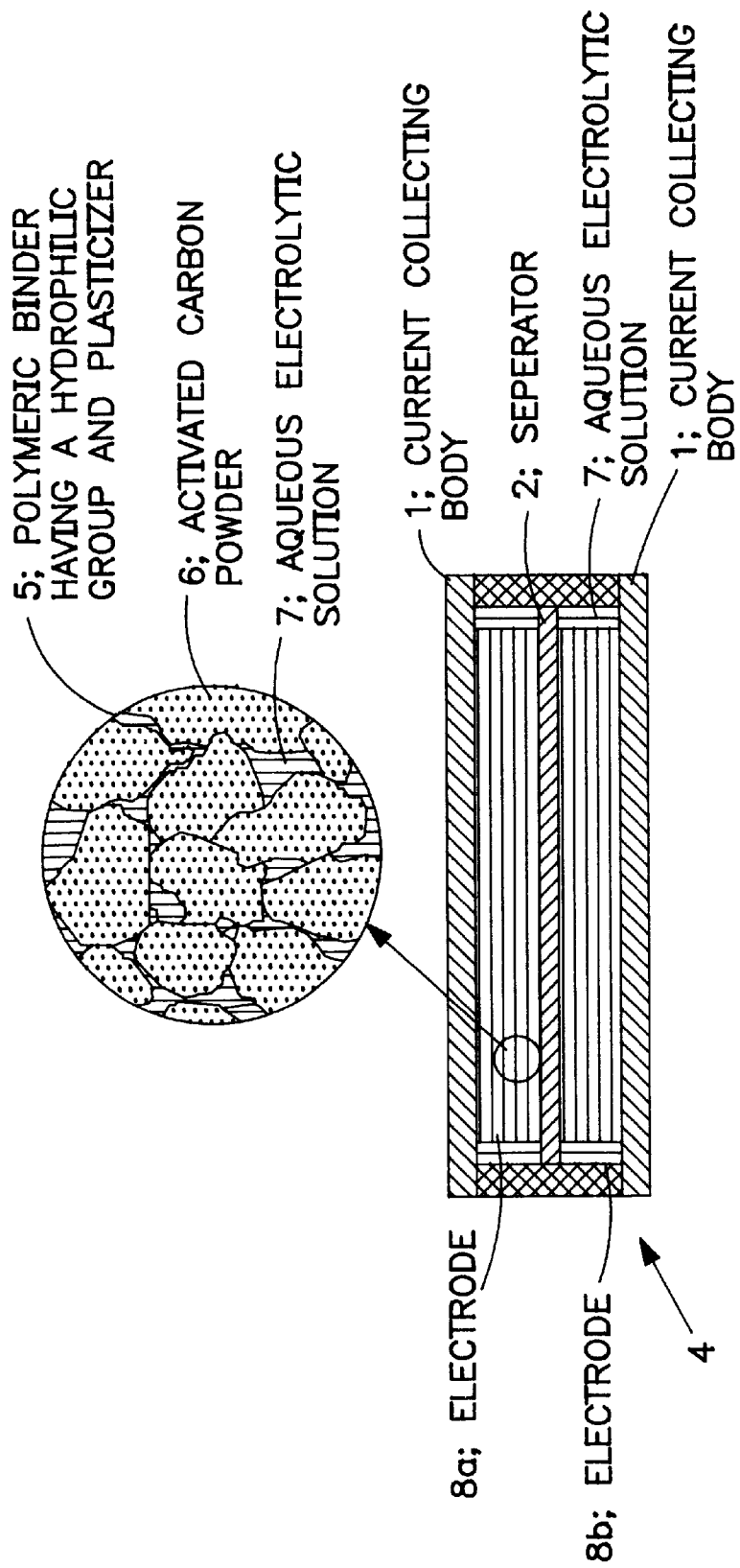
FIG. 1 is a sectional view of the electric double layer capacitor.

Preferred embodiments of the present invention will be hereinafter described. In an preferred embodiment of the present invention there is provided an electric double layer capacitor using an electrode comprising an activated carbon power, polymeric binder having an hydrophilic group and a plasticizer. Firstly, the activated carbon powder, polymeric binder having an hydrophilic group (or groups) and a plasticizer are vigorously stirred in an appropriate solvent or liquid and mixed to prepare a slurry. Using the prepared slurry, a thin film electrode sheet with a thickness of about 10 to about 500 μm is produced by a film forming equipment such as a screen printing machine, doctor blade, etc. The thin film electrode sheet obtained is dried at a temperature which will not decompose the polymeric binder having a hydrophilic group and the plasticizer to form the electrodes 8a, 8b to be used as an aqueous solution type electric double layer capacitor (4).

The aqueous solution type electric double layer capacitor (4a, 4b) comprising said activated carbon power (6), in a polymeric binder having a hydrophilic group and plasticizer (5) can be prepared by adding a polymeric binder having a hydrophilic group to the activated carbon powder, giving a strong bonding between the activated carbon particles and production of an thin type electrode.

In general, a polymer to be used as a binder has an excellent wettability with an organic solvent but poor wettability with an aqueous solution. Therefore, an aqueous electrolytic solution shows a higher contact resistance between an electrode and electrolytic solution than that of an organic solvent electrolytic solution, causing an increase in internal resistance of the electric double layer capacitor.

However, in the embodiment of the present invention, the wettability between the aqueous electrolytic solution 7 and electrode can be improved by selecting the polymeric binder having a hydrophilic group and by drying the electrode sheet at a temperature which will not decompose the polymeric binder, allowing the polymeric binder to exist even after the electrode sheet has been dried. Thus the contact resistance between the electrode and aqueous electrolytic solution can be reduced.

That is, by using a polymer having a hydrophilic group as a binder, a whole internal resistance of the aqueous electric double layer capacitor can be reduced.

Additionally, since a polymeric binder is insulating in general, the resistance of a thin type electrode per se is increased, if a polymeric binder only is added thereto. The increase in the electrode resistance causes an increase in an internal resistance of the whole capacitor, as a result, degrading rapid charging and high current discharging properties of the capacitor. Therefore, the amount of addition of the polymeric binder for production of the thin type electrode should be as small as possible.

In a preferred embodiment of the present invention, the amount of the polymeric binder to be added can be reduced by adding a plasticizer, to reduce the internal resistance of the electrode itself accordingly.

Thus, the present invention provides an aqueous electric double layer capacitor having a low internal resistance, an uniform thickness of a film, a wider area of a film, and excellent easiness of forming films and mechanical strength.

Moreover, according to the present invention, the contact resistance between the aqueous electrolytic solution and thin type electrode can be reduced by the polymeric binder having a hydrophilic group. The binder of the present invention is completely different from those as disclosed in JP Patent Kokai JP-A-62-200715(1987) and/or JP-A-59-3915(1984) accordingly.

In the case of conventional polymeric binders having hydrophilic groups disclosed in JP-A-8-111346(1996), JP-A-5-97504 (1993), JP-A-4-186812 (1992) and JP-A-3-184206 (1991), polyvinyl butyral with hydrophilic groups has been temporarily used as a polymeric binder to maintain handling ability of a green sheet in the course of the production of a ceramic capacitor, not used for the electrode in the electric double layer capacitor as disclosed in the present invention, and which are quite different from that of the electric double layer capacitor of the present invention which comprises an electrode and aqueous electrolytic solution comprising activated carbon, polymeric binder and plasticizer as constitution elements of the invention.

In accordance with the present invention, as the electrode sheet is dried at a temperature which will not decompose the polymeric binder, the polymeric binder can serve to unite the activated carbon each other even after the sheet has been dried, thus being effective in not only forming a thin type electrode but also implementing the electric double layer capacitor in the thin form and with low resistance achieved by reduction in the internal resistance of the electrode.

EXAMPLES

The examples of the present invention will be hereinafter described in detail with reference to the accompanying drawings.

In an example of the present invention, activated carbon, a polymeric binder having a hydrophilic group and a plasticizer are stirred vigorously in a solvent and mixed to obtain a slurry with a viscosity of several hundreds to thousands cP. The amount of the polymeric binder to be added preferably amounts 3 to 30% by weight of the activated carbon and the amount of the plasticizer to be added preferably amounts to 0.1 to 10% by weight of the polymeric binder. The solvent used to prepare the slurry is not restricted to any particular one and alcohol solvents such as 1-methoxy-2-propanol, 2-(2-butoxyethoxy) ethanol, etc., as far as the polymeric binder is soluble therein, may be used.

The 10 to 50 µm thin film electrode made from the slurry obtained by using a screen printing device, doctor blade, etc., is dried at a temperature which will not decompose polymeric binders and plasticizer to form an electrode sheet.

By forming the electrode sheet, current collecting body (1,), separator (2,) to a specified size and by injecting an aqueous electrolytic solution, an electric double layer capacitor is obtained as shown in FIG. 1. FIG. 1 shows a sectional view of the electric double layer capacitor and a fragmentarily enlarged view of an electrode (8a).

Various examples of the present invention are described below.

Example 1

Activated carbon, polyvinyl butyral constituting 7% by weight of the activated carbon as a polymeric binder having a hydrophilic group, butylphthalyl butylglycolate as a plasticizer constituting 0.5% by weight of polyvinyl butyral were vigorously stirred in a solvent and mixed to prepare a slurry.

In the example, a mixture of 1-methoxy-2-propanol and 2-(2-butoxy ethoxy) ethanol was used as a solvent. The solvent is not confined to any one. The viscosity of the slurry prepared was 3000 cP.

The slurry was processed by doctor blade equipment to produce a film and the produced film was dried at a temperature of 80° C. for 20 minutes to obtain an electrode sheet.

Using said electrode, an electric double layer capacitor as shown in FIG. 1 was produced (the electrolytic solution containing 40% by weight of sulfuric acid), and when its internal resistance per unit capacity (ESR, equivalent series resistance at 1 kHz) was measured, it was 84.8 [m$\Omega$/F]. This electrode sheet could be handled alone (without support device).

Example 2

Activated carbon, polyvinyl butyral constituting 5% by weight of the activated carbon as a polymeric binder having a hydrophilic group, butylphthalyl butylglycolate as a plasticizer constituting 0.5% by weight of polyvinyl butyral were vigorously stirred in a solvent and mixed to prepare a slurry.

In the example, a mixture of 1-methoxy-2-propanol and 2-(2-butoxy ethoxy) ethanol was used as a solvent, however, the solvent is not confined to any one. The viscosity of the slurry prepared was 2800 cP.

The slurry was processed by a doctor blade equipment to produce a film and the produced film was dried at a temperature of 80° C. for 20 minutes to obtain an electrode sheet.

Using said electrode, an electric double layer capacitor as shown in FIG. 1 was produced (the electrolytic solution containing 40% by weight of sulfuric acid), and when its internal resistance per unit capacity (ESR, equivalent series resistance at 1 kHz) was measured, it was 61.7 [m $\Omega$/F]. As in Example 1, this electrode sheet could be handled alone.

Comparative Example 3

Activated carbon, polytetrafluoroethylene constituting 7% by weight of the activated carbon as a polymeric binder having no hydrophilic group, butylphthalyl butylglycolate as a plasticizer constituting 0.5% by weight of polyvinyl butyral were vigorously stirred in a solvent and mixed to prepare a slurry (N-methyl-2-pyrrolidone was used as a solvent).

The slurry was processed by a doctor blade equipment to produce a film and the produced film was dried at a temperature of 100° C. for 20 minutes to obtain an electrode sheet.

Using this electrode, an electric double layer capacitor as shown in FIG. 1 was produced (the electrolytic solution containing 40% by weight of sulfuric acid), and when its internal resistance per unit capacity (ESR, equivalent series resistance at 1 kHz) was measured, it was 102.5 [m$\Omega$F].

Comparative Example 4

Activated carbon, polyvinyl butyral constituting 5% by weight of the activated carbon as a polymeric binder having a hydrophilic group were vigorously stirred in a solvent and mixed to prepare a slurry (as in the Example 1, a mixture of 1-methyl-2-propanol and 2-(2-butoxyethoxy) ethanol was used as a solvent).

The slurry was processed by a doctor blade equipment to produce a film and the produced film was dried at a temperature of 80° C. for 20 minutes to obtain an electrode sheet.

The electrode sheet was impossible to be handled alone and therefore the measurement of the internal resistance was not attempted.

The comparison between Example 1 and Comparative Example 3 demonstrates that the internal resistance of the aqueous solution electric double layer capacitor varies depending on the affinity of the binder used as an electrode to water, i.e., on whether the binder is hydrophilic or hydrophobic. Thus, the polymeric binder having a hydrophilic group is suitable as a binder of the aqueous solution electric double layer capacitor.

The comparison between Example 2 and Comparative Example 4 shows that an electrode sheet having an excellent mechanical strength can be obtained by adding a plasticizer even if less amount of the binder is used.

In the following the meritorious effects of the present invention is briefly summarized, but without limitative nature.

Namely, the present invention provides an aqueous electric double layer capacitor having low internal resistance, uniform thickness of film, wider area of film, excellent easiness of forming films and mechanical strength. Such aqueous electric double layer capacitor of the present invention can be realized by using a polymer having a hydrophilic group compatible to an aqueous electrolytic solution as a binder and by reducing the amount of the polymeric binder by adding a plasticizer.

What is claimed is:

1. An electric double layer capacitor comprising, in combination:

an aqueous electrolytic solution;

at least one pair of electrolyte-impregnated electrodes, each of said electrodes being formed of an activated carbon powder formed into self-supporting a mechanically stable sheets by means of a polymeric binder selected from the group consisting of polyvinyl pyrrolidone, polyvinyl butyryl and polyvinyl acetate, and a plasticizer.

2. An electric double layer capacitor as claimed in claim 1, wherein said aqueous electrolytic solution comprises an aqueous solution of sulfuric acid.

3. An electric double layer capacitor as claimed in claim 2, wherein said aqueous electrolytic solution contains 40% by weight sulfuric acid.

4. An electric double layer capacitor as claimed in claim 1, wherein said plasticizer comprises butylphthalylbutylglycolate.

5. An electric double layer capacitor as claimed in claim 1, wherein said plasticizer is present in an amount of about 0.5% by weight of said polymeric binder.

6. An electric double layer capacitor according to claim 1, wherein said sheet electrodes are formed from a slurry of said activated carbon powder, polymeric binder and plasticizer formed into a sheet by drying the slurry below the decomposition temperature of the polymeric binder and plasticizer.

* * * * *

UNITED STATES PATENT AND TRADEMARK OFFICE
CERTIFICATE OF CORRECTION

PATENT NO. : 6,031,712
DATED : February 29, 2000
INVENTOR(S) : Kurihara, et. al.

It is certified that error appears in the above-indentified patent and that said Letters Patent is hereby corrected as shown below:

Col. 8, Line 9, delete "a".

Signed and Sealed this

Twentieth Day of March, 2001

*Attest:*

NICHOLAS P. GODICI

*Attesting Officer*     *Acting Director of the United States Patent and Trademark Office*